(12) United States Patent
Garcia-Martin et al.

(10) Patent No.: US 9,258,259 B2
(45) Date of Patent: Feb. 9, 2016

(54) RETRIEVAL OF OFFLINE INSTANT MESSAGES

(75) Inventors: Miguel A. Garcia-Martin, Helsinki (FI); Adamu Haruna, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 11/350,088

(22) Filed: Feb. 9, 2006

(65) Prior Publication Data

US 2007/0078935 A1 Apr. 5, 2007

Related U.S. Application Data

(60) Provisional application No. 60/722,054, filed on Sep. 30, 2005, provisional application No. 60/727,870, filed on Oct. 19, 2005.

(51) Int. Cl.
*G06F 15/16* (2006.01)
*H04L 12/58* (2006.01)
*H04L 12/18* (2006.01)

(52) U.S. Cl.
CPC .......... *H04L 51/04* (2013.01); *H04L 12/1831* (2013.01); *H04L 51/00* (2013.01); *H04L 51/24* (2013.01)

(58) Field of Classification Search
CPC .......... H04L 51/00; H04L 51/04; H04L 51/24
USPC .......... 709/223, 202–206, 217–219, 227–228
See application file for complete search history.

(56) References Cited

U.S. PATENT DOCUMENTS

| | | | | |
|---|---|---|---|---|
| 5,923,848 A | * | 7/1999 | Goodhand et al. | 709/219 |
| 5,999,932 A | * | 12/1999 | Paul | 707/10 |
| 6,052,709 A | * | 4/2000 | Paul | 709/202 |
| 6,212,553 B1 | * | 4/2001 | Lee et al. | 709/206 |

(Continued)

FOREIGN PATENT DOCUMENTS

| | | |
|---|---|---|
| JP | 2004-342098 A | 12/2004 |
| JP | 2005-073160 A | 3/2005 |

(Continued)

OTHER PUBLICATIONS

Leggio, Simone, "*SIP for Instant Messaging and Presence Leveraging Extensions*", Mar. 18, 2005, pp. 1-6.

(Continued)

*Primary Examiner* — Bharat N Barot
(74) *Attorney, Agent, or Firm* — Mintz Levin Cohn Ferris Glovsky and Popeo, P.C.

(57) ABSTRACT

Retrieving messages stored in a mail server and pending to be retrieved by a user is disclosed. A summary of the messages stored in the mail server and pending to be retrieved by the user is received at a terminal device of the user, each message associated with a unique identifier. At least one of the messages to be retrieved from the mail server is selected on the basis of the summary of messages. From the unique identifier associated with the at least one message an identifier valid for retrieval of the at least one message is determined, and a retrieval request with the identifier valid for retrieval is sent to the mail server. Upon receiving the retrieval request with the at least one identifier valid for retrieving the at least one of the stored messages, the mail server sends the at least one message towards the terminal device.

28 Claims, 5 Drawing Sheets

(56) References Cited

U.S. PATENT DOCUMENTS

| | | | |
|---|---|---|---|
| 6,493,007 B1* | 12/2002 | Pang | 715/835 |
| 6,549,950 B2* | 4/2003 | Lytle et al. | 709/246 |
| 6,728,714 B1* | 4/2004 | Doganata et al. | 707/10 |
| 6,920,502 B2* | 7/2005 | Araujo et al. | 709/229 |
| 6,982,041 B2* | 1/2006 | Laverdiere et al. | 210/767 |
| 6,993,563 B2* | 1/2006 | Lytle et al. | 709/206 |
| 7,010,616 B2* | 3/2006 | Carlson et al. | 709/246 |
| 7,058,687 B2* | 6/2006 | Kucherawy | 709/206 |
| 7,174,368 B2* | 2/2007 | Ross, Jr. | 709/207 |
| 7,953,394 B2* | 5/2011 | Jordan, Jr. | H04L 12/5835 709/206 |
| 8,478,825 B2* | 7/2013 | Gustafsson | H04L 51/14 709/206 |
| 8,533,271 B2* | 9/2013 | Gupta | G06Q 10/107 709/206 |
| 2003/0165231 A1 | 9/2003 | Singh et al. | |
| 2005/0232229 A1 | 10/2005 | Miyamoto et al. | |

FOREIGN PATENT DOCUMENTS

| | | |
|---|---|---|
| JP | 2005269534 A | 9/2005 |
| WO | WO-2004100581 A1 | 11/2004 |

OTHER PUBLICATIONS

Mahy, R., "*A Message Summary and Message Waiting Indication Event Package for the Session Initiation Protocol*" Aug. 2004, pp. 1-19.

Meyers, J., "*RFC 1939: Post Office Protocol Version 3*", XP-002197697, May 1996, pp. 1-23.

International Search Report PCT/IB2006/053769 filed Oct. 13, 2006.

M. Handley and V. Jacobson, Network Working Group, Request for Comments: 2327, Category: Standards Track, "SDP: Session Description Protocol," Apr. 1998, pp. 1-42.

J. Rosenberg, et al., Network Working Group, Request for Comments: 3261, Category: Standards Track, "SIP: Session Initiation Protocol," Jun. 2002, pp. 1-269.

R. Sparks, Network Working Group, Request for Comments: 3420, Category: Standards Track, "Internet Media Type Message/Sipfrag," Nov. 2002, pp. 1-8.

B. Campbell, et al., Network Working Group, Request for Comments: 3428, Category: Standards Track, "Session Initiation Protocol (SIP) Extension for Instant Messaging," Dec. 2002, pp. 1-18.

G. Camarillo and A. Johnston, Sipping Working Group, Internet-Draft, "Conference Establishment Using Request-Contained Lists in the Session Initiation Protocol (SIP)," Apr. 8, 2004, pp. 1-10.

R. Mahy, Network Working Group, Request for Comments: 3842, Category: Standards Track, "A Message Summary and Message Waiting Indication Event Package for the Session Initiation Protocol (SIP)," Aug. 2004, pp. 1-19.

G. Camarillo and A. Roach, SIPPING Working Group, Internet-Draft, "Framework and Security Considerations for Session Initiation Protocol (SIP) Uniform Resource Identifier (URI)—List Services," Apr. 8, 2005, pp. 1-12.

B. Campbell, et al., Simple WG, Internet-Draft, "The Message Session Relay Protocol," Oct. 6, 2005, pp. 1-54.

Certified English language translation of summary for "Practical Course of SIP (Session Initiation Protocol) that is conscious of authentication and security", N+i Network, May 6, 2004, vol. 4, No. 6, pp. 130-135, by Kazunori Sato.

English translation of the Notice of Preliminary Rejection, dated Nov. 23, 2009, issued by the Korean Intellectual Property Office, in connection with counterpart Korean application No. 10-2008-7009283.

* cited by examiner

RETRIEVAL OF OFFLINE INSTANT MESSAGES

REFERENCE TO RELATED APPLICATIONS

This application claims priority of U.S. Provisional Patent Application Ser. No. 60/722,054 filed Sep. 30, 2005 and U.S. Provisional Patent Application Ser. No. 60/727,870 filed Oct. 19, 2005. The subject matter of these earlier filed applications is hereby incorporated by reference.

BACKGROUND OF THE INVENTION

Field of the Invention

The present invention is related to instant messaging based on SIP (Session Initiation Protocol)/SIMPLE (SIP for Instant Messaging and Presence Leveraging Extensions) technology. In particular, this invention addresses the problem that arises when a mail server stores instant messages in the network for further delivery to an end user (presumably when the user connects to the network at a later time).

It is assumed that a user A sends one or more instant messages to a user B. The technology used to deliver those messages can be based on SIP MESSAGE method or the Message Session Relay Protocol (MSRP). It is further assumed that user B is not registered to its SIP server, and that a mail application server is storing the actual instant messages for further delivery to user B at a later time.

When the user B registers to its SIP network, the SIP User Agent subscribes to a Message Summary and Waiting Indicator event package and gets notifications of the messages that are pending to be retrieved. It is assumed that the mail server stores a large amount of instant messages, so user B gets a notification that contains summary of those stored instant messages.

The present invention should enable an improved retrieval of offline instant messages.

SUMMARY OF THE INVENTION

Figure 1:
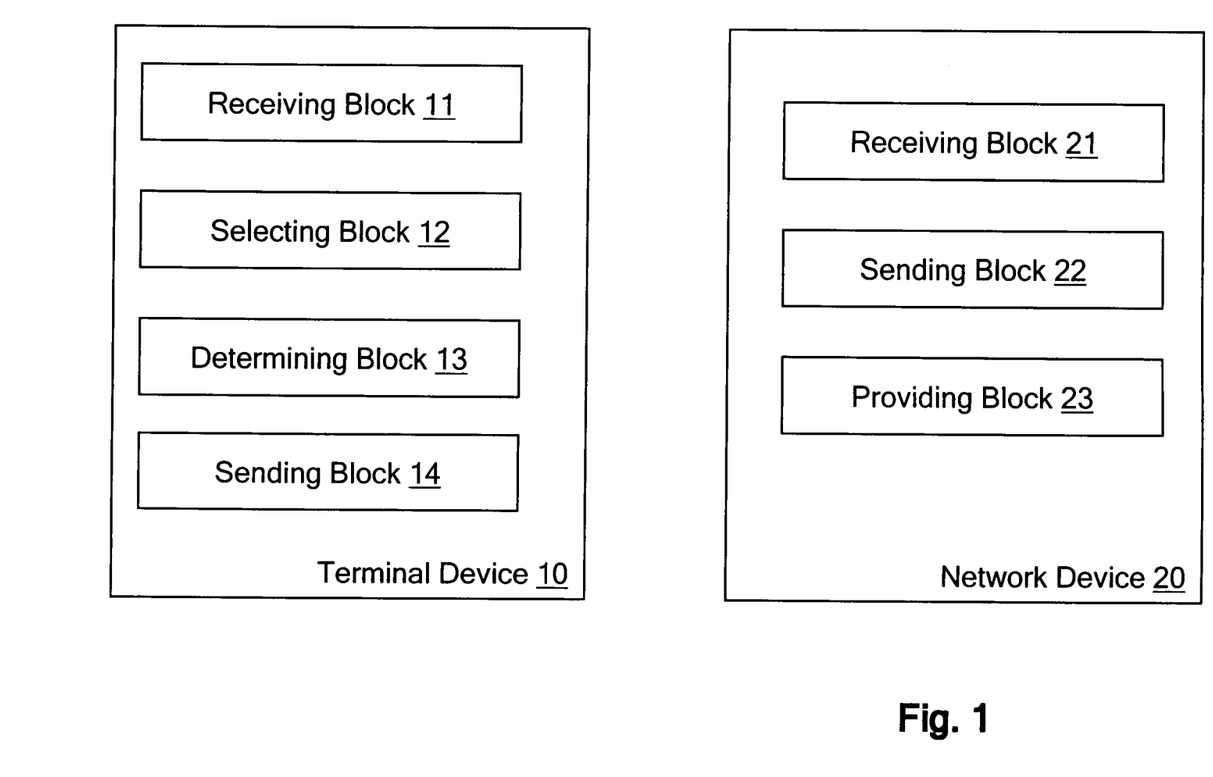
FIG. 1 shows a schematic block diagram illustrating a configuration of a terminal device and a network device according to the invention.

FIG. 1 shows a schematic block diagram illustrating a configuration of a terminal device and a network device according to the invention.

The terminal device 10 comprises a receiving block 11, a selecting block 12, a determining block 13 and a sending block 14. The receiving block 11 receives a summary of messages stored in a mail server such as the network device 20 and pending to be retrieved by a user, each message associated with a unique identifier. The selecting block 12 selects at least one of the messages to be retrieved from the mail server, on the basis of the summary of messages. The determining block 13 determines an identifier valid for retrieval of the at least one message on the basis of the unique identifier associated with the at least one message, thereby obtaining at least one identifier valid for retrieval. And the sending block 14 sends a retrieval request with the at least one identifier valid for retrieval to the mail server.

The unique identifier may be a message identifier provided by the mail server or a Uniform Resource Identifier (URI).

The network device 20 such as a mail server stores messages pending to be retrieved by a user, and comprises a receiving block 21 and a sending block 22. The receiving block 21 receives a retrieval request with at least one identifier valid for retrieving at least one of the stored messages, and the sending block 22 sends the at least one message towards a terminal device (e.g. the terminal device 10) of the user originating the retrieval request.

The sending block 22 may send the at least one message in a Message Session Relay Protocol (MSRP) SEND message.

According to a first embodiment, the network device 20 may further comprise a providing block 23 which provides a message identifier for each of the stored messages, wherein the sending block 22 sends a summary of the stored messages to the user, e.g. the terminal device 10, each message associated with the determined message identifier.

The providing block 23 may use a Call-ID header field included in a Session Initiation Protocol request of each of the stored messages for the message identifier or generate a unique Uniform Resource Identifier (URI), the URI being routable to the network device wherein the message identifier is part of the URI.

The providing block 23 may use a Message-ID header field of a Message Session Relay Protocol request of each of the stored messages for the message identifier.

According to a second embodiment, the network device 20 may comprise a conference server and virtual endpoints such as virtual SIP User Agents corresponding to the stored messages. The conference server may receive a retrieval request from the user comprising a list of identifiers pointing to selected ones of the stored messages, the retrieval request establishing a first session for delivering the selected messages, establish second sessions for each of the selected messages identified in the list with the virtual endpoints corresponding the selected messages, and receive the selected messages within said second sessions and forward the selected messages to the user within said first session.

It is to be noted that the configuration shown in FIG. 1 is for illustrating the invention, and the terminal device and the network device may comprise further blocks implementing further functions (such as a storing block in the network device 20 for storing the messages) which are not relevant for understanding the invention and the description of which is omitted here.

Figure 2:
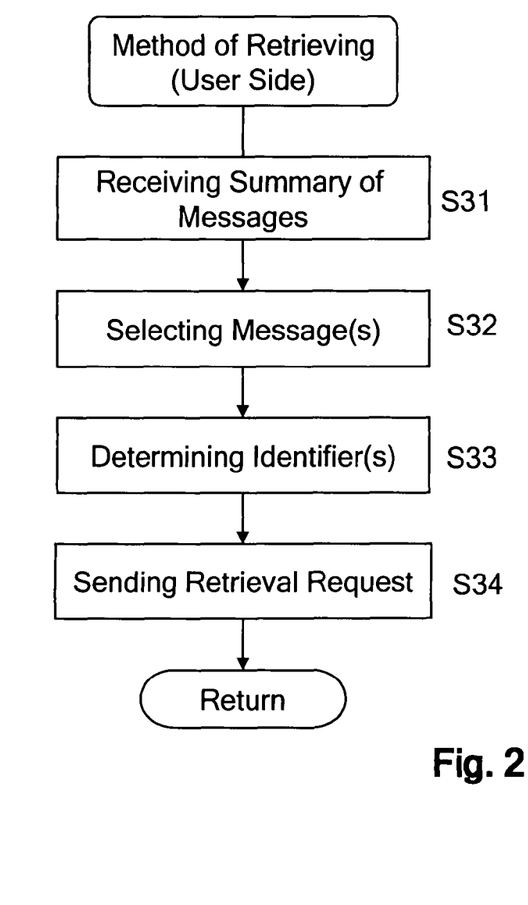
FIG. 2 shows a flow diagram illustrating a retrieval method according to the invention.

FIG. 2 shows a flow diagram illustrating a method of retrieving messages from a mail server on a side of the terminal device 10. In step S31, a summary of messages stored in the mail server and pending to be retrieved by a user is received on the terminal device, each message associated with a unique identifier. In step S32, at least one of the messages to be retrieved from the mail server is selected on the basis of the summary of messages received in step S31. In step S33, an identifier valid for retrieval of the at least one message is determined on the basis of the unique identifier associated with the at least one message to, thereby obtaining at least one identifier valid for retrieval, and in step S34 a retrieval request with the identifier valid for retrieval is sent to the mail server.

Figure 3:
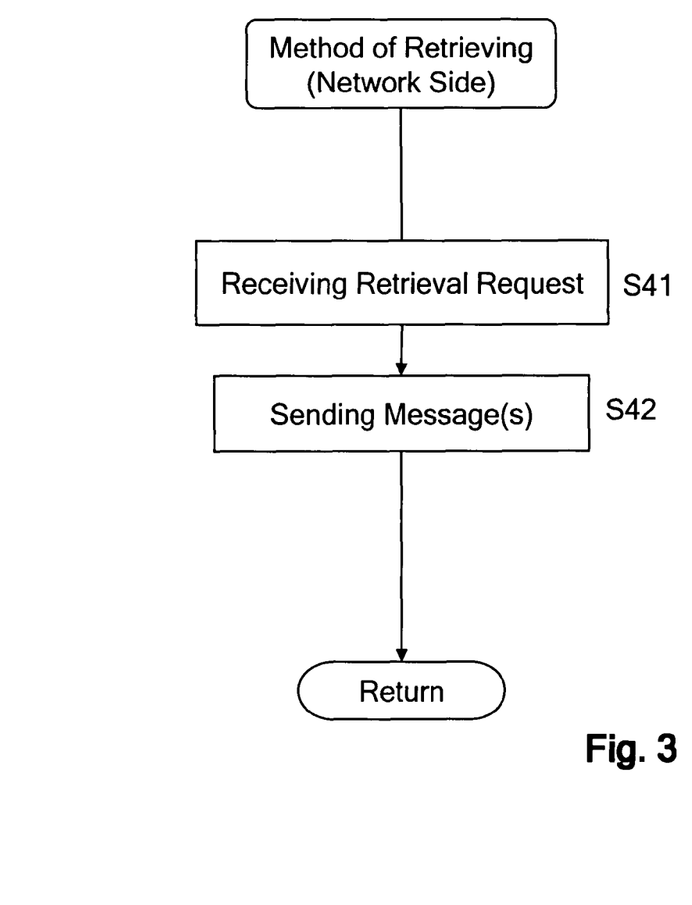
FIG. 3 shows a flow diagram illustrating a retrieval method according to the invention.

FIG. 3 shows a flow diagram illustrating a method of retrieving messages from a mail server on a side of the network device 20. In step S41, a retrieval request with at least one identifier valid for retrieving at least one of the stored messages is received, and in step S42 the at least one message is sent towards a terminal device of the user originating the retrieval request.

According to the second embodiment, a retrieval request from the user comprising a list of identifiers pointing to selected ones of the stored messages is received at the network device 20, the retrieval request establishing a first session for delivering the selected messages. Second sessions are established for each of the selected messages identified in the list, and the selected messages are received within said second sessions and the selected messages are forwarded to the user within said first session.

The invention may be implemented also as computer program product.

The mail server can be implemented as a mail store application server or instant message mail server.

According to the first embodiment of the invention, a user receives a message summary notification that includes a unique message identity allocated to each stored message. For each message that the user wants to retrieve, the SIP User Agent creates a SIP session of messages addressed to the identity of the message, e.g., after doing some transformation. The server, on receiving the INVITE request, is able to uniquely determine the actual message that the user wants to retrieve.

This solution allows the user to select those stored instant messages that should be retrieved. The advantage is enormous in mobile scenarios, where the bandwidth is limited, and especially in cases where the number and size of stored instant messages is relevant. So the user can select to retrieve those messages targeted as urgent, or which have been received from a particular user, and then read the remaining messages at a later time.

According to the second embodiment of the invention, a mechanism is provided whereby the user, once it has selected the instant messages that he wants to retrieve from the mail server, creates a single session (SIP INVITE) addressed to the selected messages, by making usage of the URI-list concept. This embodiment models the mail server as composed of a conference server and a number of virtual SIP user agents, each one representing a stored instant message.

According to this embodiment, a mechanism is provided to select and retrieve selected messages already stored in the mail server in an optimized way that can be used in mobile environments. According to this solution, the user can retrieve an unlimited selected number of stored messages in a single protocol operation.

This solution allows the user to minimize the signaling and round trips to retrieve selected messages by using a single session towards the mail server. The provisional patent application "Method and apparatus for instant messaging" by Garcia et al. filed with the U.S. Patent and Trademark Office on Sep. 30, 2005, the content of which is incorporated herein by reference, and the first embodiment allow to retrieve either the whole bulk of stored instant messages, or selected messages one by one (meaning, each message required a separate SIP session).

Thus, the second embodiment of this invention increases the user experience due to the lower delays in setting up sessions, and optimizes resource handling over the low bandwidth channels, such as the air interface.

DESCRIPTION OF THE EMBODIMENTS OF THE INVENTION

Assuming that instant messages have been deposited in a user's mailbox, when the user's phone switches on, the phone sends a subscription to a message-summary event package, and receives a notification with the pending message; according to RFC3842 "A Message Summary and Message Waiting Indication Event Package for the Session Initiation Protocol (SIP)." The content of RFC 3842 is hereby incorporated by reference. This mechanism is also application to VOICE MAIL, FAX, etc. The Notifier (a SIP User Agent acting on behalf of the user's messaging system) sends a message summary of the stored messages in the body of a NOTIFY e.g. "there are 4 old messages and 3 new messages waiting for you".

Optionally, after the summary counts, message headers such as To, From, Date, Subject, and Message-ID may be appended to each message.

Once the User/UE (User Equipment) is notified, it can send an INVITE to the server including the type of desired media to retrieve (for the purpose of the Messaging group in OMA (Open Mobile Alliance), the INVITE must include an SDP (Session Description Protocol) description of MSRP, but may include also other media types).

Additionally, the user can apply a mechanism as described in the provisional patent application "Method and Apparatus for Instant Messaging" to retrieve all the stored instant messages from the mail server, including meta-data information (e.g., sender, time of delivery, etc.). For this purpose, a SIP mechanism is provided to retrieve instant messages which were previously deposited in an application server that was acting as a message store application server. This can be achieved by maintaining the relevant headers of the SIP message by encapsulating it as a message/sip, for example, as defined in RFC 3261 Section 27.5, or as a message/sipfrag, as defined in RFC 3420, and then sending it as the payload of an MSRP SEND request. The contents of RFC 3261 and 3420 are hereby incorporated by reference. Additionally, a storing application server can then add a header to the MSRP SEND message and to the encapsulated SIP message containing the time and date when the message was received. More particularly, a date/time header is inserted in every stored SIP and MSRP message. Novel semantics can be used for the encapsulation of the stored instant messages, and the message/sip and message/sipfrag are used in MSRP, outside of its original context. Thus, a method of delivering encapsulated SIP messages is provided, including the header information, as the payload of an MSRP message.

With the above mechanism, a method and apparatus are provided whereby a user can contact his mail server and retrieve existing instant messages already deposited in the store message application server. The instant messages can be deposited in the store message application server using SIP MESSAGE requests (as per IETF RFC 3428) or MSRP messages (e.g., MSRP SEND requests) that are part of a SIP session. The content of RFC 3428 is hereby incorporated by reference. The metadata and/or header information can enable the user to determine the source of the message, the time at which message was left, etc.

Once the SIP session is established with the MSRP media, all stored messages will be transferred from the server to the user/UE. Each stored message will be sent in a separate MSRP SEND request (before chunking of MSRP SEND requests takes place), and each one will be identified by its own original Message-ID. In this way the user retrieves all the messages in one shot, but still is able to classify all the messages by Message-ID.

One of the shortcomings of some solutions is that the original sender identification (user information) is necessarily lost because the MSRP headers do not contain any relation to the SIP URI that deposits the message. Therefore, the association of senders to their particular messages already available in messaging application inboxes such as e-mail, instant messaging, MMS, etc., will be lost. This also applies to SIP MESSAGE requests, in that they can be sent but the recipient will not be able to identify the sender, because it is set to the store message application server.

A mechanism is proposed whereby the user, when he or she wants to retrieve his stored instant messages, establishes an MSRP session with his store message application server. The store message AS encapsulates each received session or standalone MESSAGE in an MSRP SEND request. So each MSRP SEND request represents a SIP session or MESSAGE that contains a payload (one or more MSRP SEND requests, or some other type in the case of message).

However, with the above mechanisms the user B is not allowed to retrieve a selected message (e.g., sent by a given user, during a specific time frame, whose subject is a specific one, or with a given priority). Particularly, there is no mechanism where user B can indicate to the mail server which message the user is interested in receiving.

First Embodiment

Figure 4:
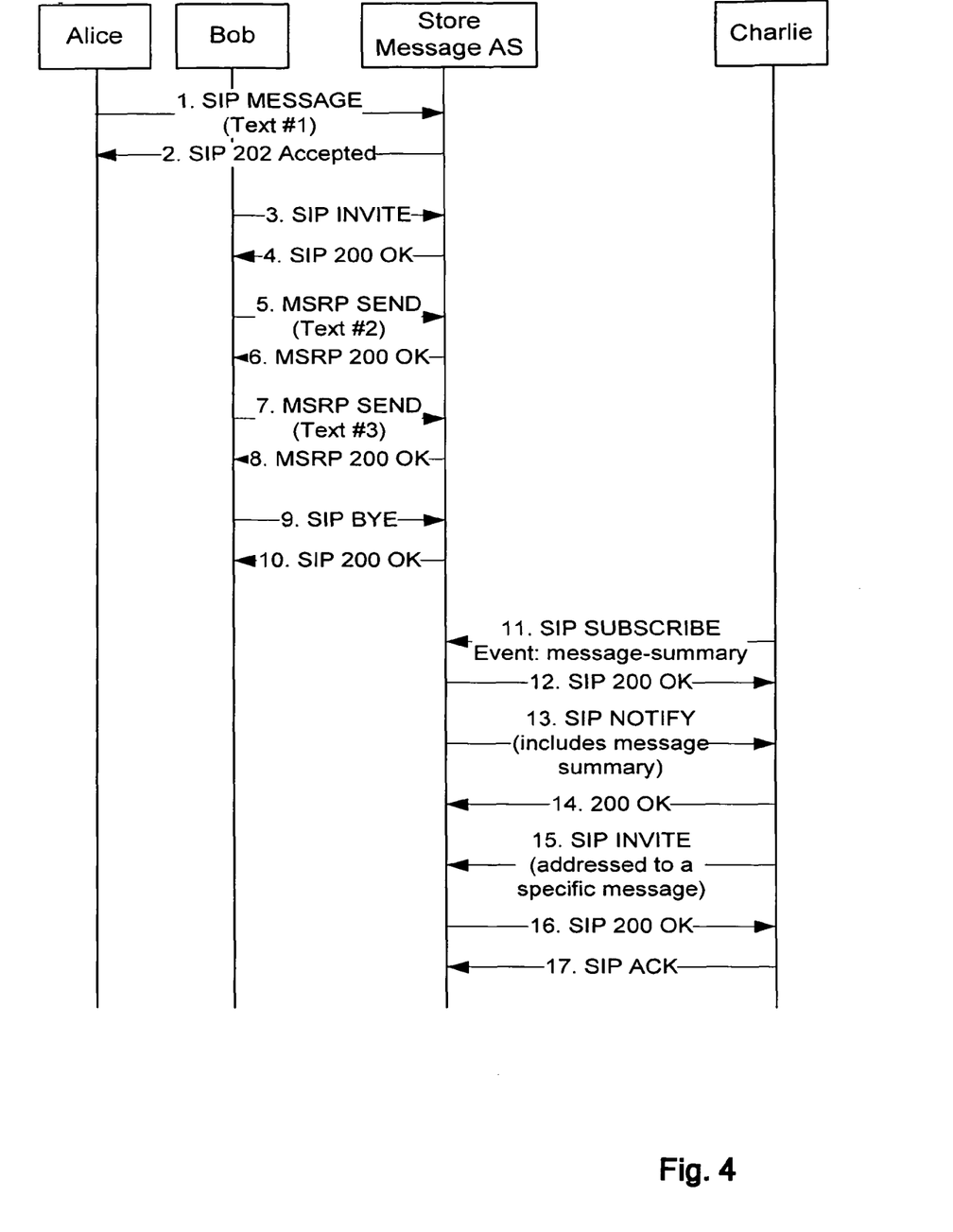
FIG. 4 shows a signaling diagram according to a first embodiment of the invention.

FIG. 4 shows a signaling diagram illustrating messages exchanged between users and a store message application server (AS) according to a first embodiment. As shown in FIG. 4, Alice sends an Instant Message to Charlie using a SIP MESSAGE request (flow 1). This MESSAGE request contains some text, named here Text #1. Assuming that Charlie is offline, the message is received and stored at the store message Application Server (AS).

Another user, Bob, creates a SIP session by sending an INVITE request (flow 3) to Charlie. The INVITE request contains a session description that includes an MSRP descriptor for the purpose of sending session-based instant messages. Since Charlie is offline, the store message AS intercepts the INVITE request and establishes the session. Then Charlie deposits two messages in Charlie's messaging account, using MSRP SEND requests (flows 5 and 7, including a Text #2 and Text #3, respectively). That is, the actual messages are sent with MSRP SEND requests. Message #9 is a SIP BYE request that terminates the session of instant messages.

At a later time, Charlie connects to the network and subscribes to message-summary notifications, by sending a SIP SUBSCRIBE request (message #11) towards his mail server, i.e. the store message AS.

The notifications are included in the NOTIFY request (message #13). The notifications that the user receives from the subscription to the message summary and message waiting indicator event package contain, among other elements, a unique identifier of each message, in the format of a Message-ID header. The mail server selects the Message-ID for each message. In a typical mapping, the Message-ID in the notification can contain the same value as the Call-ID header field in the SIP MESSAGE or SIP INVITE requests (that initiated the MSRP session), or the Message-ID in the notification can contain the same value as the Message-ID header field in the MSRP SEND request. Once Charlie has selected the message to be retrieved, he creates an INVITE request (message #15) addressed to the specific message to be retrieved.

There are two alternative and similar implementation examples of the first embodiment:

Implementation Example A

The mail server copies the Call-ID header field included in SIP to the Message-ID header of the message summary, or it copies the Message-ID header of the MSRP SEND request to the Message-ID header of the message summary. Thus, each stored SIP MESSAGE, complete MSRP session (which has been initiated by a SIP INVITE), or individual MSRP SEND request is uniquely identified by the Message-ID. Now, when the user selects a particular message to be retrieved, from the message summary, the stored message is allocated a unique SIP URI that is built upon the Message-ID header in the message summary.

This allows to retrieve messages one by one if they were deposited with a SIP MESSAGE request. If the messages were deposited with a collection of MSRP SEND requests (within an INVITE-BYE session), then the solution allows to retrieve either all the MSRP messages that were part of the session identified by the Call-ID of the SIP INVITE, or each individual stored MSRP SEND request.

The following is an example of the message summary notification that user B receives. The notification indicates that two new text messages are waiting to be retrieved.

```
NOTIFY sip:charlie@pc.example.com SIP/2.0
To: <sip:charlie@example.com>;tag=78923
From: <sip:mailserver.example.com>;tag=4442
Date: Mon, 10 Jul 2000 04:28:53 GMT
Contact: <sip:mailserver.example.com>
Call-ID: adsf0923jsdjw
CSeq: 31 NOTIFY
Event: message-summary
Subscription-State: active
Content-Type: application/simple-message-summary
Content-Length: 503
Messages-Waiting: yes
Message-Account: sip:charlie@mailserver.example.com
Text-Message: 2/0 (1/0)
To: <charlie@example.com>
From: <alice@example.org>
Subject: carpool tomorrow?
Date: Sun, 09 Jul 2000 21:23:01 -0700
Priority: normal
Message-ID: 32098d@alicepc.example.org
To: <charlie@example.com>
From: <bob@example.com>
Subject: HELP! at home ill, present for me please
Date: Sun, 09 Jul 2000 21:25:12 -0700
Priority: urgent
Message-ID: d0982dkjs@bobmobile.example.com
```

It is assumed that Charlie wants to retrieve only the second message, which has been sent by bob@example.com and is identified by a Message-ID header whose value is d0982dkjs@bobmobile.example.com. Charlie then creates a SIP INVITE request addressed to a SIP URI (whose general format is "sip:username@hostname") composed as follows:
The escaped value of the selected Message-ID, as the username in the URI
The hostname of the mail server (this is typically preconfigured in the SIP User Agent).

That is, the user (i.e. Charlie) maps the unique identifier of the stored instant message into an identifier valid for retrieval.

Continuing with our example, Charlie creates a SIP INVITE request (e.g. message #15 in FIG. 4) whose Request-URI is:

sip:
d0982dkjs%40bobmobile.example.com@mailserver.example.com

The "%40" is the escaped character corresponding to an "@" sign (this is standard practice in SIP).

For example, the user (i.e. Charlie) will send the following INVITE (only relevant headers are printed) to the voice mail server (the store message AS) in message #15.

```
INVITE
sip:d0982dkjs%40bobmobile.example.com@mailserver.example
.com SIP/2.0
From: <sip:charlie@example.com>
To:
<sip:d0982dkjs%40bobmobile.example.com@mailserver.exampl
e.com>
```

This INVITE request is routed to the mail server (the store message AS) according to regular SIP procedures. The mail server extracts the "username", unescapes it to get the original message ID, retrieves that message, and sends it to Charlie. For this purpose, the mechanisms described in the provisional patent application "Method and Apparatus for Instant Messaging" may be applied.

For example, the store message AS takes the stored SIP INVITE message #3 in FIG. 4, the stored MSRP SEND requests #5 and #7, and the stored SIP BYE message #9, and encapsulates them in an MSRP SEND request (not shown), also with the message type set to message/sip (Section 27.5 of RFC 3261) or message/sipfrag (RFC 3420).

Implementation Example B

This implementation is essentially the same as A. The only difference is that the mail server populates the Message-ID header, not with the value of the Call-ID header of the SIP MESSAGE or INVITE that deposited the instant message, but instead, with a unique URI that points to the mail server and identifies the message.

For example, the following is the same NOTIFY request as indicated with the implementation example A, but modified to implementation example B:

```
NOTIFY sip:charlie@pc.example.com SIP/2.0
To: <sip:charlie@example.com>;tag=78923
From: <sip:mailserver.example.com>;tag=4442
Date: Mon, 10 Jul 2000 04:28:53 GMT
Contact: <sip:mailserver.example.com>
Call-ID: adsf0923jsdjw
CSeq: 31 NOTIFY
Event: message-summary
Subscription-State: active
Content-Type: application/simple-message-summary
Content-Length: 503
Messages-Waiting: yes
Message-Account: sip: charlie@mailserver.example.com
Text-Message: 2/0 (1/0)
To: <charlie@example.com>
From: <alice@example.org>
Subject: carpool tomorrow?
Date: Sun, 09 Jul 2000 21:23:01 -0700
Priority: normal
Message-ID: 120932@mailserver.example.com
To: <charlie@example.com>
From: <bob@example.com>
Subject: HELP! at home ill, present for me please
Date: Sun, 09 Jul 2000 21:25:12 -0700
Priority: urgent
Message-ID: 120933@mailserver.example.com
```

So, if Charlie wants to retrieve the same second message delivered by Bob, he will create an INVITE request addressed to the value of the Message-ID allocated by the mail server to that message, which uniquely identify the message in the server. In this alternative, there is no need to translate the received Message-ID to something else, before creating the Request-URI of the SIP message, i.e., the value of the Message-ID of the message to be retrieved is copied to the Request-URI of the SIP request.

```
INVITE sip: 120933@mailserver.example.com SIP/2.0
From: <sip: charlie@example.com>
To: <sip:120933@mailserver.example.com>
```

Second Embodiment

Similar to the above it is assumed that a user has been offline for sometime, and some other users have deposited one or more instant messages in the store message AS, typically using a combination of SIP (Session Initiation Protocol, RFC 3261) and MSRP (Message Session Relay Protocol, Internet-Draft draft-ietf-simple-message-sessions-12.txt) as protocols. When the user becomes online (connected to the network) the user can retrieve all the stored instant messages, e.g., by applying the mechanisms described in the provisional patent application "Method and Apparatus for Instant Messaging". However, this mechanism operates on ALL the stored instant messages.

The above-described first embodiment allows the user to select either one and exactly one instant message for retrieval (if the message was delivered with a SIP MESSAGE request), one and exactly one session of instant messages (if they were deposited by using SIP INVITE and a number of MSRP SEND requests), or one and exactly one MSRP SEND message. This mechanism presents a problem if the user wants to retrieve more than one instant message or more than one session of instant messages or more than one (but not all) MSRP SEND messages belonging to the same session, because for every retrieval action the user has to establish a separate SIP session (i.e., the user has to send a separate SIP INVITE request) to the mail server.

This obviously presents problems, especially in mobile environments. On one side, this creates delays in between consecutive retrieved messages, due to the addition 1.5 round trips (INVITE-200-ACK) to the signaling flow. Additionally, each of these INVITE request might contain a large number of headers, so there number of bytes transferred between the user agent and the mail server is not negligible.

According to the second embodiment it is assumed that:
Instant messages addressed to a particular user have been deposited in a mail server.
There is a mechanism in place by which the user is informed of a summary of the instant messages pending to be retrieved. This mechanism includes a unique identifier of each message in the mail server. An example of such mechanism is described in RFC 3842, "A Message Summary and Message Waiting Indication Event Package for the Session Initiation Protocol (SIP)".
There is a mechanism that allows the user to map the unique identifier of the stored instant messages into an identifier valid for retrieval. An example of such mechanism is described in the first embodiment.
There is a mechanism whereby the user can establish a session to retrieve one or more stored instant messages. An example of such mechanism is described in the provisional patent application "Method and Apparatus for Instant Messaging".

According to the second embodiment, a store message AS or mail server host is modeled as a virtual entity comprising:
A URI-list server exploder for SIP INVITE transactions, also known as a conference server according to "Conference Establishment Using Request-Contained Lists in the Session Initiation Protocol (SIP)", draft-ietf-sipping-uri-list-conferencing-03.txt, the content of which is incorporated herein by reference.
One or more virtual SIP User Agents, also contained in the same mail server host. Each of this virtual SIP User Agents represents a resource, which in the case of the invention, is effectively a stored instant message or session of instant messages. A characteristic is that each instant message or session of instant messages is identified by a unique uniform resource identifier (URI).

Figure 5:
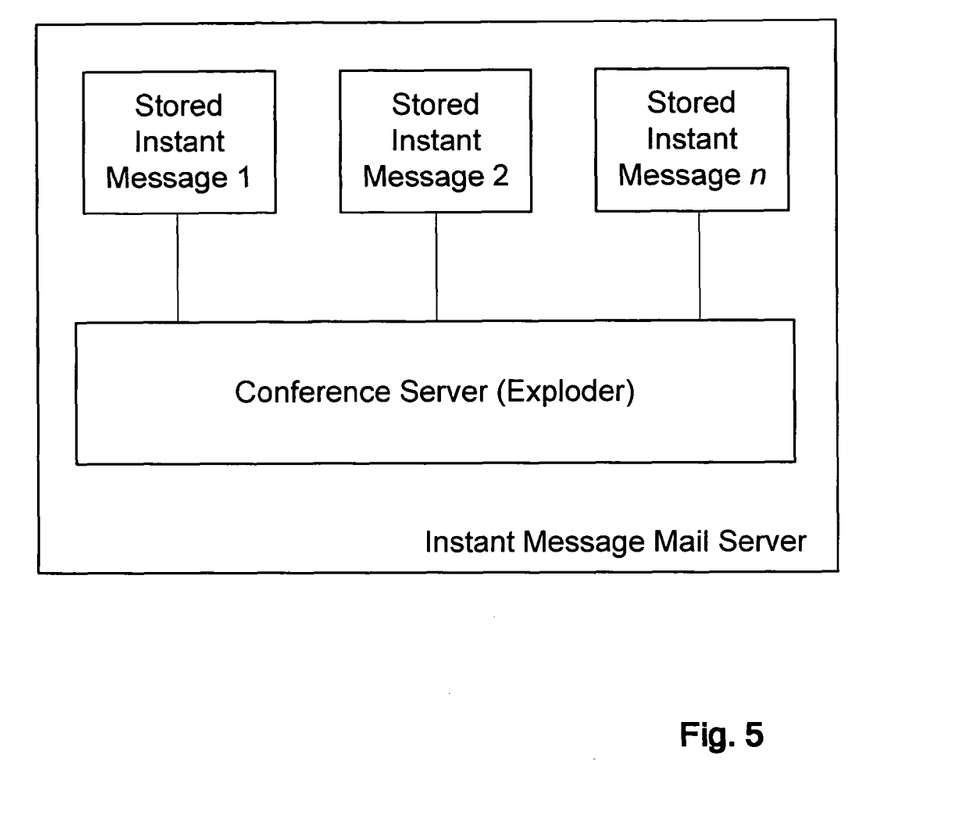
FIG. 5 shows a schematic block diagram illustrating a mail server host according to a second embodiment of the invention.

FIG. 5 schematically shows the model of the mail server host (instant message mail server), integrating a conference server and a number of virtual SIP User Agents, each one representing a stored instant message.

Figure 6:
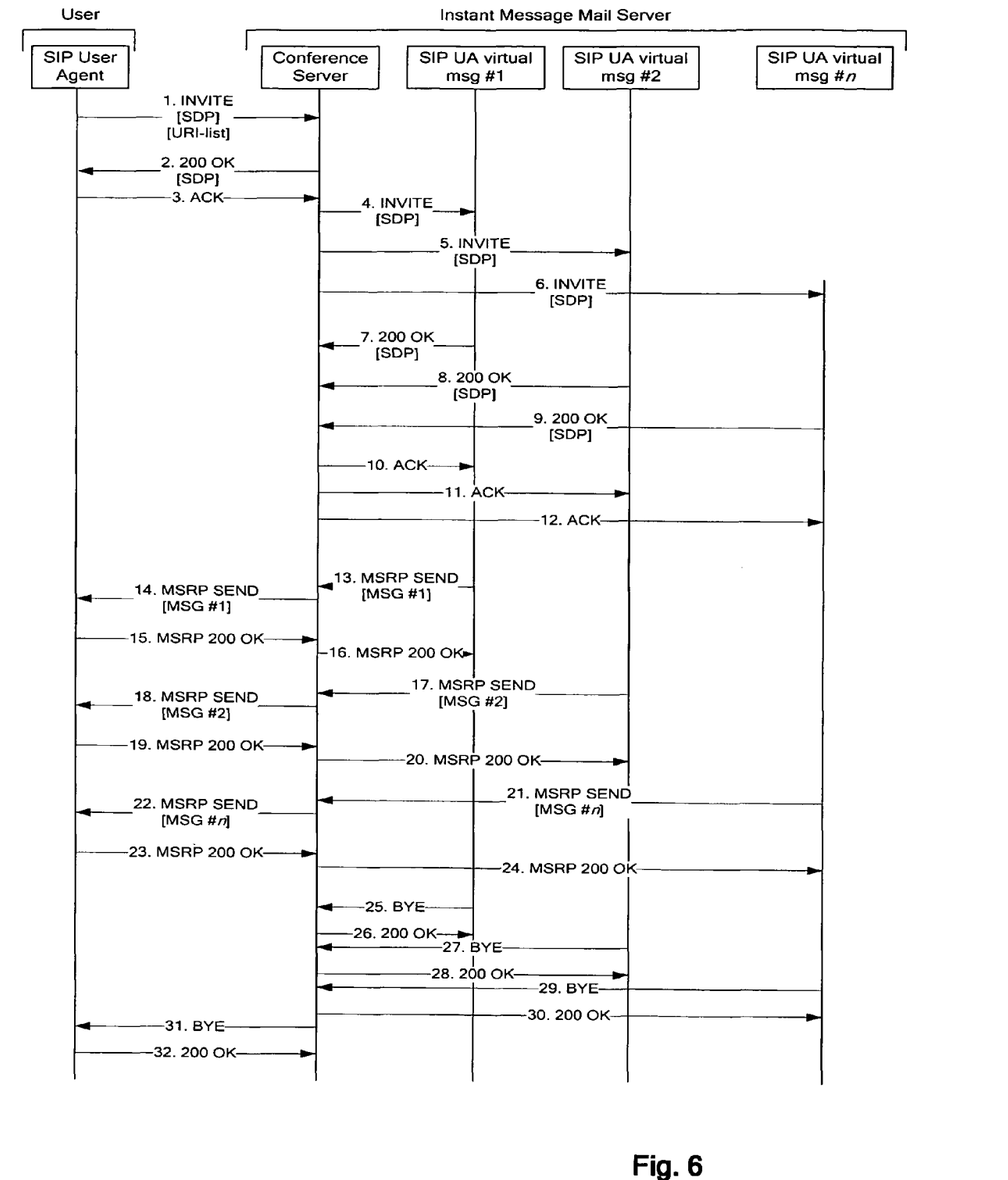
FIG. 6 shows a signaling diagram according to the second embodiment of the invention.

FIG. 6 shows a signaling diagram illustrating messages exchanged between a user and the instant message mail server according to the second embodiment.

Having modeled the mail server as indicated, when a user wants to retrieve a selection of stored instant messages by setting up a single SIP session, the user agent sends a single SIP INVITE request (message #1) that contains two message bodies: the Session Description Protocol (RFC 2327) to setup the instant message session, and a URI-list (as indicated in draft-ietf-sipping-uri-list-conferencing-03.txt). The SDP indicates the willingness to establish at least a message media stream based on MSRP (draft-ietf-simple-message-sessions-12.txt). The URI-list contains one or more URIs, each one uniquely identifying a stored instant message in the server that the user wants to retrieve. The mail server answers with a 200 OK response (message #2) that contains SDP indicating a message media stream based on MSRP.

On receiving such INVITE request, the conference server part of the mail server explodes the INVITE request to each of the virtual SIP User Agents that identify the stored message. The conference server sends an INVITE request that includes SDP to each of the URIs indicated in the URI list of the incoming INVITE. In other words, the conference server of the mail server sends an INVITE request to each of the URIs contained in the URI-list of the INVITE (#1). These are the INVITE requests #4, #5, and #6 in FIG. 6. Each one contains an SDP body that indicates the willingness to establish at least a message media stream based on MSRP.

This creates a virtual centralized conference between the end user and each of the virtual SIP User Agents that identify a given message. Then each of these virtual SIP User Agents sends the stored instant message to the conference server, which in turn, relays them to the end user. In other words, the virtual SIP User Agents answer with a 200 OK message containing their own SDP (messages #7, #8, and #9 in FIG. 6), and then they send the stored message (or session of instant messages), e.g., by applying the procedures indicated in the provisional patent application "Method and Apparatus for Instant Messaging" (this corresponds to the rest of the messages #13 to #24 in FIG. 6).

In particular, each virtual SIP user agent may take the stored MESSAGE, keep the relevant headers of SIP MESSAGE requests (e.g., From, To, Call-ID, P-Asserted-Identity, etc.), encapsulates it as either a message/sip (Section 27.5 of RFC 3261) or message/sipfrag (RFC 3420), and send it as the payload of a MSRP SEND request (messages #13, #17, #21 in FIG. 6).

Similarly, each virtual SIP user agent may take the stored SIP INVITE message, the corresponding stored MSRP SEND requests, and the corresponding stored SIP BYE message, and encapsulate them in another MSRP SEND request (messages #13, #17, #21), also with the message type set to message/sip or message/sipfrag. Similarly, each virtual SIP user agent may take the stored MSRP SEND request, encapsulate it as message/msrp, and send it as the payload of a MSRP SEND request (#13, #17, #21).

The invention covers all possible combinations and permutations. For example, the MSRP SEND request #13 can encapsulate a stored MSRP SEND request, whereas the MSRP SEND request #15 can encapsulate a SIP MESSAGE request, or the MSRP SEND request #17 can encapsulate a SIP INVITE request that includes all the MSRP SEND requests sent as part of that session and a SIP BYE request.

Once a virtual SIP UA has delivered its stored instant message to the server, it sends a BYE request (messages #25, #27, and #29 in FIG. 6) to the conference server to end the session. Once the last virtual SIP UA has disconnected, the conference server sends a BYE request (message #31) to the user to end the session.

At the end, the end user has retrieved a selection of the stored instant messages in just one signaling session.

It is to be noted that the mail server is considered to be composed of a conference server and a number of virtual SIP User Agents, each one representing a stored instant message. A monolithic implementation of the mail server is considered, which is further decomposed for better understanding. However, this does not impose a restriction of an implementation, and implementations may decide to separate in different hosts each of the components of the mail server. In such case, the term "mail server" is used to refer to the collection of those hosts.

It is also to be noted that, in the case of the monolithic implementation of the mail server, the interfaces that are defined between the conference server and each of the SIP virtual User Agent become internal calls or a defined API, but need not necessarily be implemented with SIP.

It is important to note that embodiments of the invention are also applicable to offline message "push" delivery mechanisms. In push delivery systems, the store messaging application server knows when an offline user gets back online, i.e. either by SIP SUBSCRIBE/NOTIFY and/or any other mechanism.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:
1. An apparatus comprising:
at least one processor; and
at least one memory including computer program code, the at least one processor, the at least one memory, and the computer program code configured to cause the apparatus to at least:
receive a summary of messages stored in a mail server and pending retrieval by a user, each message associated with a unique identifier, wherein the messages pending retrieval are instant messages carried by a sequence of session initiation protocol messages that are intercepted and stored by an application server;

select at least one of the messages to be retrieved from the mail server, based on the summary of messages;

determine an identifier valid for retrieval of the at least one message based on the unique identifier associated with the at least one message, thereby obtaining at least one identifier valid for retrieval;

send a retrieval request with the at least one identifier valid for retrieval to the mail server, the retrieval request being configured to establish a session for delivering the at least one message to the user, wherein the retrieval request is a session initiation protocol invite message; and receive, in response to the retrieval request, encapsulated messages including the session initiation protocol messages.

2. The apparatus of claim 1, wherein the unique identifier is a message identifier.

3. The apparatus of claim 1, wherein the unique identifier is a uniform resource identifier.

4. An apparatus comprising:
at least one processor; and
at least one memory including computer program code, the at least one processor, the at least one memory, and the computer program code configured to cause the as apparatus to at least:
receive a retrieval request with at least one identifier valid for retrieving at least one message of messages stored pending retrieval by user, the retrieval request being configured to establish a session for delivering the at least one message to the user, wherein the retrieval request is a session initiation protocol invite message, wherein the established session is a session initiation protocol session, and wherein the messages pending retrieval are instant messages carried by a sequence of session initiation protocol messages; and
send, in response to the session initiation protocol invite message, the at least one message to the user originating the retrieval request in the session, wherein the at least one message is encapsulated to include the session initiation protocol messages.

5. The apparatus of claim 4, wherein the at least one message is carried by a message session relay protocol send message.

6. The apparatus of claim 4, wherein the processor is further configured to provide a message identifier for each of the stored messages, and to send a summary of the stored messages to the user, each message associated with the provided message identifier.

7. The apparatus of claim 6, wherein the processor is configured to use a call identification header field included in a session initiation protocol request of each of the stored messages for the provided message identifier.

8. The apparatus of claim 6, wherein the processor is configured to use a message identification header field of a message session relay protocol request of each of the stored messages for the provided message identifier.

9. The apparatus of claim 6, wherein the processor is configured to generate a unique uniform resource identifier, the uniform resource identifier being routable to the apparatus and wherein the provided message identifier is part of the uniform resource identifier.

10. An apparatus, comprising:
a conference server; and
virtual endpoints corresponding to stored instant messages pending retrieval by a user,
wherein the conference server is configured to receive a retrieval request from the user comprising a list of identifiers each pointing to a selected message of the stored instant messages,
wherein the retrieval request is configured to establish a first session initiation protocol session for delivering the selected instant messages,
wherein the conference server is configured to establish second session initiation protocol sessions for each of the selected instant messages identified in the list with the virtual endpoints corresponding to the selected messages, and
wherein the conference server is configured to receive the selected instant messages within the second session initiation protocol sessions and forward the selected instant messages to the user within the first session initiation protocol session.

11. The apparatus of claim 10, wherein the virtual endpoints are virtual session initiation protocol user agents.

12. An apparatus comprising:
at least one processor; and
at least one memory including computer program code, the at least one processor, the at least one memory, and the computer program code configured to cause the apparatus to at least:
receive a retrieval request from a user comprising a list of identifiers each pointing to a selected message of stored messages in a mail server pending retrieval by the user, the retrieval request establishing a first session for delivering the selected messages, wherein the retrieval request is a session initiation protocol invite message, wherein the first session is a session initiation protocol session, and wherein the messages pending retrieval are instant messages carried by a sequence of session initiation protocol messages that are intercepted and stored by an application server;
establish second sessions for each of the selected messages identified in the list, wherein the second sessions are session initiation protocol sessions; and
receive, in response to the retrieval request, the selected messages within the second sessions and forwarding the selected messages to the user within the first session, wherein, receiving the selected messages comprises receiving encapsulated messages including the session initiation protocol messages.

13. A method comprising:
receiving a summary of messages pending retrieval by a user, each message associated with a unique identifier, wherein the messages pending retrieval are instant messages carried by a sequence of session initiation protocol messages that are intercepted and stored by an application server;
selecting at least one message of the messages to be retrieved, based on the summary of messages;
determining an identifier valid for retrieval of the at least one message based on the unique identifier associated with the at least one message, thereby obtaining at least one identifier valid for retrieval;
sending a retrieval request with the at least one identifier valid for retrieval to the mail server, the retrieval request is configured to establish a session for delivering the at least one message to the user, wherein the retrieval request is a session initiation protocol invite message; and
receiving, in response to the retrieval request, encapsulated messages including the session initiation protocol messages.

14. The method of claim 13, wherein the unique identifier is a message identifier.

15. The method of claim 13, wherein the unique identifier is a uniform resource identifier.

16. A method comprising:
receiving a retrieval request with at least one identifier valid for retrieving at least one message of messages stored pending retrieval by a user, the retrieval request being configured to establish a session for delivering the at least one message to the user, wherein the retrieval request is a session initiation protocol invite message, wherein the established session is a session initiation protocol session, and wherein the messages pending retrieval are instant messages carried by a sequence of session initiation protocol messages; and
sending, in response to the session initiation protocol invite message, the at least one message to the user originating the retrieval request in the session, wherein the at least one message is encapsulated to include the session initiation protocol messages.

17. The method of claim 16, further comprising:
providing a message identifier for each of the stored messages; and
sending a summary of the stored messages to the user, each message associated with the provided message identifier.

18. The method of claim 17, wherein the providing comprises using a call identification header field included in a session initiation protocol request of each of the stored messages for the provided message identifier.

19. The method of claim 17, wherein the providing comprises using a message identification header field of a message session relay protocol request of each of the stored messages for the provided message identifier.

20. The method of claim 17, wherein the providing comprises generating a unique uniform resource identifier, the uniform resource identifier being routable to the apparatus and wherein the provided message identifier is part of the uniform resource identifier.

21. The method of claim 16, wherein the sending comprises sending the at least one message in a message session relay protocol SEND message.

22. A method, comprising:
receiving a retrieval request from a user comprising a list of identifiers each pointing to a selected message of stored messages in a mail server pending retrieval by the user, the retrieval request establishing a first session for delivering the selected messages, wherein the retrieval request is a session initiation protocol invite message, wherein the first session is a session initiation protocol session, and wherein the messages pending retrieval are instant messages carried by a sequence of session initiation protocol messages that are intercepted and stored by an application server;
establishing second sessions for each of the selected messages identified in the list, wherein the second sessions are session initiation protocol sessions; and
receiving, in response to the retrieval request, the selected messages within the second sessions and forwarding the selected messages to the user within the first session, wherein receiving the selected messages comprises receiving encapsulated messages including the session initiation protocol messages.

23. The method of claim 22, wherein the virtual endpoints are virtual session initiation protocol user agents.

24. A non-transitory computer-readable medium including computer program code which when executed by at least one processor causes operations comprising:
receiving a summary of the messages pending retrieval by a user, each message associated with a unique identifier, wherein the messages pending retrieval are instant messages carried by a sequence of session initiation protocol messages that are intercepted and stored by an application server;
selecting at least one message of the messages to be retrieved, based on the summary of messages;
determining an identifier valid for retrieval of the at least one message based on the unique identifier associated with the at least one message, thereby obtaining at least one identifier valid for retrieval;
sending a retrieval request with the at least one identifier valid for retrieval to the mail server, the retrieval request being configured to establish a session for delivering the at least one message to the user, wherein the retrieval request is a session initiation protocol invite message; and
receiving, in response to the retrieval request, encapsulated messages including the session initiation protocol messages.

25. The computer program product according to claim 24, wherein the computer program product comprises a computer-readable medium on which the software code portions are stored.

26. The computer program product according to claim 24, wherein the program is directly loadable into an internal memory of the processing device.

27. A non-transitory computer-readable medium including computer program code which when executed by at least one processor causes operations comprising:
receiving a retrieval request with at least one identifier valid for retrieving at least one message of messages stored pending retrieval by a user, the retrieval request configured to establish a session for delivering the at least one message to the user, wherein the retrieval request is a session initiation protocol invite message, wherein the established session is a session initiation protocol session, and wherein the messages pending retrieval are instant messages carried by a sequence of session initiation protocol messages;
sending, in response to the session initiation protocol invite message, the at least one message to the user originating the retrieval request in the session, wherein the at least one message is encapsulated to include the session initiation protocol messages.

28. A non-transitory computer-readable medium including computer program code which when executed by at least one processor causes operations comprising:
receiving a retrieval request from a user comprising a list of identifiers each pointing to a selected message of stored messages in a mail server pending retrieval by the user, the retrieval request establishing a first session for delivering the selected messages, wherein the retrieval request is a session initiation protocol invite message, wherein the first session is a session initiation protocol session, and wherein the messages pending retrieval are instant messages carried by a sequence of session initiation protocol messages that are intercepted and stored by an application server;
establishing second sessions for each of the selected messages identified in the list, wherein the second sessions are session initiation protocol sessions; and receiving, in response to the retrieval request, the selected messages within the second sessions and forwarding the selected messages to the user within the first session,
wherein, receiving the selected messages comprises receiving encapsulated messages including the session initiation protocol messages.

* * * * *